(12) United States Patent
Gross

(10) Patent No.: US 11,561,125 B1
(45) Date of Patent: Jan. 24, 2023

(54) REFRIGERATOR WITH INVENTORY MONITORING AND MANAGEMENT SYSTEM

(71) Applicant: Idealab, Pasadena, CA (US)

(72) Inventor: William Gross, Pasadena, CA (US)

(73) Assignee: Idealab, Pasadena, CA (US)

( * ) Notice: Subject to any disclaimer, the term of this patent is extended or adjusted under 35 U.S.C. 154(b) by 626 days.

(21) Appl. No.: 16/566,602

(22) Filed: Sep. 10, 2019

Related U.S. Application Data

(60) Provisional application No. 62/734,111, filed on Sep. 20, 2018.

(51) Int. Cl.
*G01G 19/414* (2006.01)
*G01G 23/37* (2006.01)
*F25D 29/00* (2006.01)
*G06Q 50/28* (2012.01)

(52) U.S. Cl.
CPC ....... *G01G 19/4144* (2013.01); *F25D 29/005* (2013.01); *G01G 23/3728* (2013.01); *G06Q 50/28* (2013.01); *F25D 2500/06* (2013.01); *F25D 2700/06* (2013.01)

(58) Field of Classification Search
CPC ............ G01G 19/4144; G01G 23/3728; F25D 2500/06; F25D 2700/06; G06Q 50/28
See application file for complete search history.

(56) References Cited

U.S. PATENT DOCUMENTS

| | | | |
|---|---|---|---|
| 7,092,789 B2 * | 8/2006 | Chavez | G07F 5/26 700/214 |
| 2005/0046584 A1 * | 3/2005 | Breed | B60R 21/01536 340/13.31 |
| 2006/0178947 A1 * | 8/2006 | Zsigmond | G06Q 30/0601 705/37 |
| 2018/0245840 A1 | 8/2018 | Chen et al. | |
| 2019/0066034 A1 | 2/2019 | Giacomini | |
| 2019/0113276 A1 | 4/2019 | Ebrom et al. | |
| 2019/0226755 A1 | 7/2019 | Johnston | |
| 2019/0249485 A1 | 8/2019 | Jeong et al. | |

* cited by examiner

*Primary Examiner* — Paul Danneman
(74) *Attorney, Agent, or Firm* — Knobbe, Martens, Olson & Bear LLP

(57) ABSTRACT

A detection system for estimating a weight of one or more items in a refrigerator is disclosed. The system comprises at least one shelf; at least one transducer configured to transmit a sonic or ultrasonic wave into the at least one shelf and capture the reflected or refracted wave from the shelf; and a processor configured to estimate the weight of the one or more items on the shelf from the sonic or ultrasonic wave received from the at least one transducer. The system further comprises a plurality of cameras configured to capture images of the one or more items on the shelf. The cameras are configured to capture images of the items while on the shelf and off the shelf, which are then used to identify the items and the changes in weight of those items. Items may be automatically reorder based on their weight or change in weight.

10 Claims, 2 Drawing Sheets

REFRIGERATOR WITH INVENTORY MONITORING AND MANAGEMENT SYSTEM

CROSS-REFERENCE TO RELATED APPLICATION(S)

This application claims the benefit of U.S. Provisional Patent Application Ser. No. 62/734,111 filed Sep. 20, 2018, titled "Refrigerator with inventory monitoring and management system," which is hereby incorporated by reference herein for all purposes.

TECHNICAL FIELD

The invention features a system for determining the weight and identity of items on a shelf. In particular, the invention relates to a system for using images and vibration measurements to identify items on a shelf in a refrigerator.

BACKGROUND

The prior art describes refrigerators with cameras for acquiring images of items in the refrigerator. However, this is not enough information to determine the quantity of items or when to order items in the refrigerator. There is therefore a need for a system to accurately determine when to order items in the refrigerator.

SUMMARY

The preferred embodiment of the present invention includes a refrigerator with a novel detection system for estimating a weight of one or more items in a refrigerator or other appliance. The system comprises at least one shelf; at least one transducer configured to transmit a sonic or ultrasonic wave into the at least one shelf and capture the reflected or refracted wave from the shelf; and a processor configured to estimate the weight of the one or more items on the shelf from the sonic or ultrasonic wave captured by the at least one transducer. The system further comprises a plurality of cameras configured to capture images of the one or more items on the shelf, preferably when the items are placed on the shelf and taken off the shelf. The images are then used to identify the items and the changes in weight of those items. Items may be automatically reorder based on their weight or change in weight.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
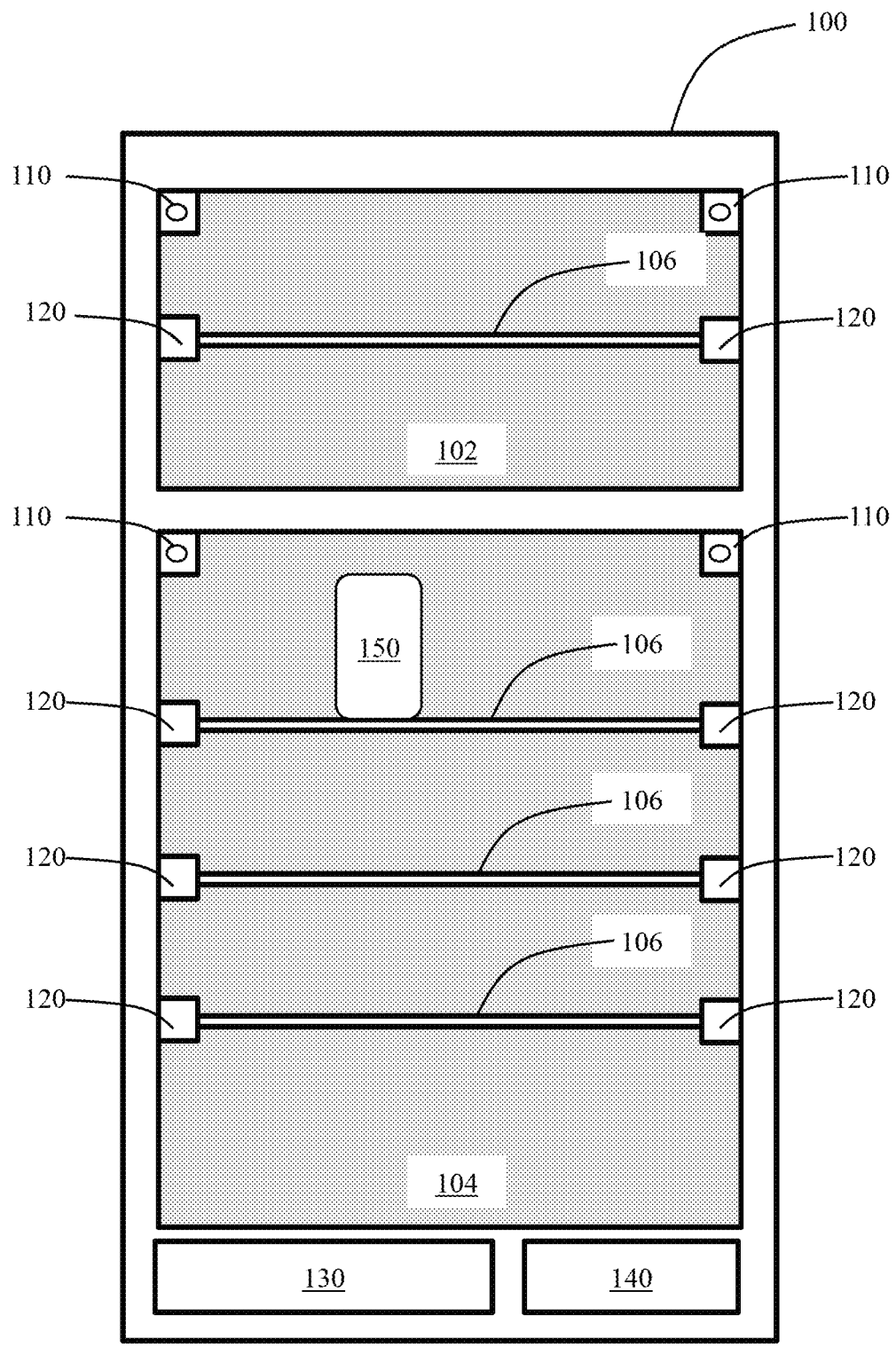
FIG. 1 is a front side view of the inside of a refrigerator, in accordance with a preferred embodiment of the present invention.

Illustrated in FIG. 1 is a front side view of the inside of a refrigerator 100 including a freezer compartment 102 and fridge compartment 104. Each compartment 102, 104 includes a novel detection system for determining the items 150 on the shelves 106 as well as the weight of those items. The detection system includes a plurality of cameras 110, transducers 120, processing unit 130, and memory 140.

The cameras 110 are configured to capture images/video of every item placed in and removed from the refrigerator 100. The processing unit 130 then applies object recognition software to identify the items from the pictures/video and a database of known items, for example, in memory 140. For example, when the item 150 is first placed in the refrigerator 100, the processing unit 130 determines the identity of the item based on its packaging including the product name as well as text on the packaging, logos on the packaging, the shape of the packaging, and a barcode on the item if visible. The identified item and its location are then recorded in memory 140.

Figure 2:
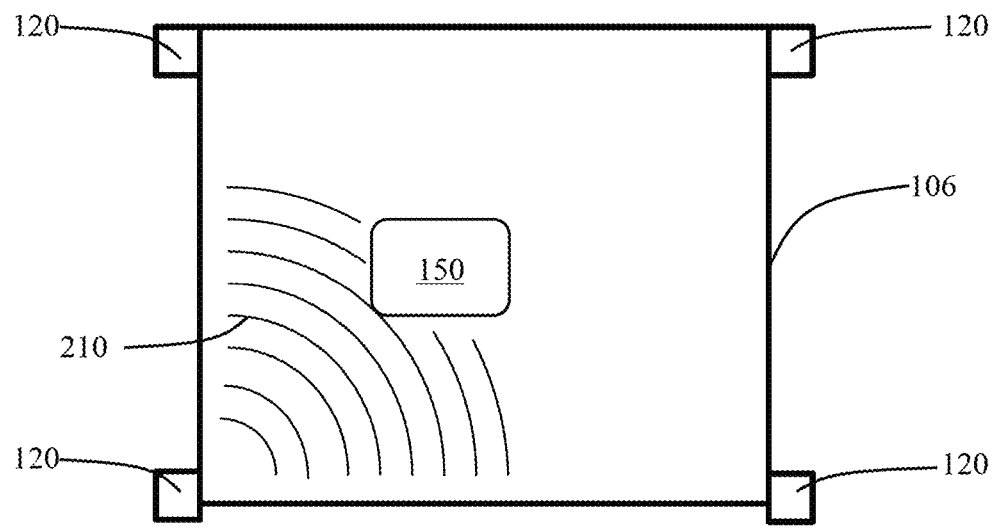
FIG. 2 is a shelf and multiple transducers configured to transmit sonic or ultrasonic waves into or through the shelf, in accordance with a preferred embodiment of the present invention.

The transducers 120 are mounted to edges of the shelf where they are configured to indirectly sense the weight of the item 150 or plurality of items on the shelf 120. As shown in FIG. 2, a transducer 120 is configured to transmit a sonic or ultrasonic wave 210 which propagate through or across the shelf 106. For a sonic or ultrasonic wave 210 having a single frequency or narrow band of frequencies, the wave may be represented by a set of wavefronts spaced apart by the period of the wave propagating through the shelf 106. As one skilled in the art will appreciate, the sonic or ultrasonic wave 210 may also be characterized by a band or frequencies or an impulse comprising a wide band of frequencies.

Figure 3:
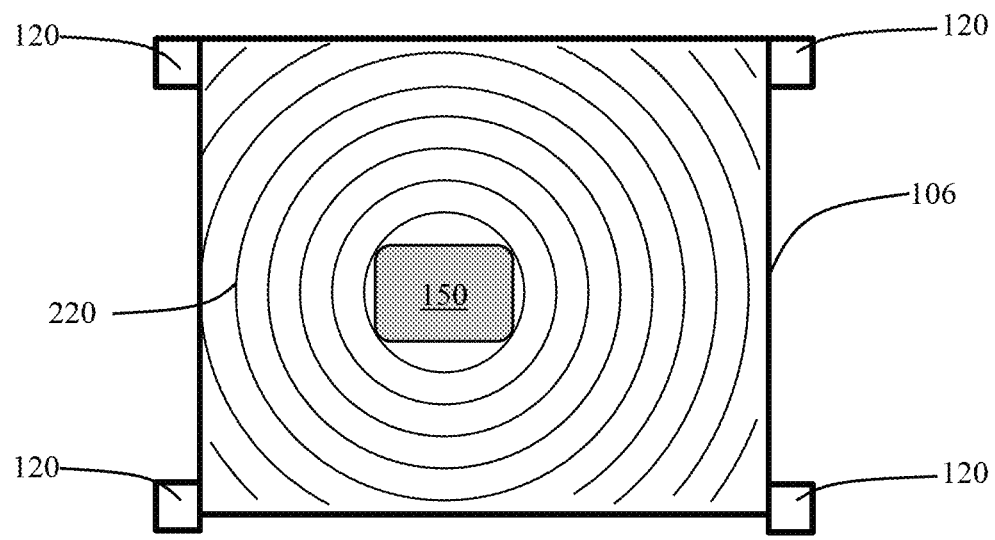
FIG. 3 is a shelf and multiple transducers configured to receive or capture sonic or ultrasonic waves after propagating through the shelf, in accordance with a preferred embodiment of the present invention.

The presence of the item 150 changes the propagation of the wave transmitted into the shelf 106, producing both reflection and refraction of the incident wave 210. The reflection and refraction may be represented as a wave pattern 220 of re-radiation of the original wave 210 from the one or more items 150, as shown in FIG. 3. The pattern of reflection and refraction is a function of the weight of the one or more items 150 on the shelf 106 as well as the distribution of weight on the shelf. The precise pattern of reflection and refraction is then measured by all the transducers 120 coupled to the shelf 106. The transducer 120 measurements may include amplitude of the envelope of the reflected and refracted wave as function of the time.

In addition to propagation of the wave, the transducers 120 can also detect the frequency of the wave propagating though the shelf, of the wave envelope decomposed into a frequency spectrum using a Fourier Transform or Fast Fourier Transform, for example.

A transducer measurement can include one transducer transmitting a sonic or ultrasonic wave while the other transducers listen or sense. The processes of generating a sonic or ultrasonic wave with a transducer and measuring the response at the plurality of transducers is repeated for each of the transducers coupled to the shelf 106.

The plurality of transducer measurements of a shelf are then sent to the processing unit 130, which analyzes the pattern of radiation and estimates the weight of the item 150. The item weight can be determined based on the difference in frequency of the wave propagating though the shelf before and after the item 150 is placed on the shelf. All things being equal, the frequency of oscillation of the shelf is reduced when the weight carried by the shelf is increased. The frequency measurements before the item is placed on the shelf and the frequency measurement after the item is placed on the shelf can therefore be used to compute a weight difference. This weight difference is the weight of the item itself.

The process of identifying each item is repeated each time an item is placed in or removed from the refrigerator. The process of estimating the weight of each item is also repeated each time an item is placed in the refrigerator. The estimated weight is then associated with the item 150 identifier in memory 140. Together, this info provides a detailed inventory of the items and amount of those items in the refrigerator 100. This info, may in turn, be used to notify the user when an item is running low, or even to automatically reorder the item if necessary.

The determined weight of an item can also be used to predict the rate at which an item is consumed. The rate at which the item is consumed may be estimated for purposes of predicting when to automatically replace or reorder the item. If the item is a carton of milk that is consumed at a rate of four cup per day, for example, a new carton of milk must be reordered and restocked within 4 days of the milk carton's first use to avoid running out of milk.

In the preferred embodiment, the weight detection system includes a plurality of transducers. In other embodiments, lasers may be used to directly measure the vibration of the shelfs and those vibration measurements used to estimate the weight of one or more items on the shelf. In some other embodiments, the weight detection system is employed with other household appliances including ovens, microwave ovens, stoves, pantry shelving systems, and dishwashers for example.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A detection system for estimating a weight of one or more items, the system comprising:
   a shelf configured to support items in a refrigerated space;
   at least one transducer coupled to an edge of the shelf configured to support items in a refrigerated space, wherein the at least one transducer coupled to the edge of the shelf configured to support items in a refrigerated space is configured to:
   transmit a sonic or ultrasonic wave comprising a single frequency, a band of frequencies, or an impulse, into the shelf to thereby propagate the sonic or ultrasonic wave through or across the shelf configured to support items in a refrigerated space; and
   at least one transducer, coupled to the shelf, configured to receive sonic or ultrasonic waves from the shelf comprising reflected and/or refracted waves; and
   a processor configured to estimate the weight of an item on the shelf based on sonic or ultrasonic waves, comprising reflected and/or refracted waves, received at the at least one transducer configured to receive sonic or ultrasonic waves, prior to the item being placed on the shelf configured to support items in a refrigerated space and on sonic or ultrasonic waves comprising reflected and/or refracted waves received at the at least one transducer configured to receive sonic or ultrasonic waves while the item is on the shelf configured to support items in a refrigerated space.

2. The detection system of claim 1, wherein the estimate of the weight of the item is based on a measured weight difference, wherein the measured weight difference is based on a first weight measurement with the item on the shelf and a second weight measurement the item not on the shelf.

3. The detection system of claim 2, wherein the first weight measurement is based on a first frequency of the sonic or ultrasonic wave received from the shelf, and the second weight measurement is based on a second frequency of the sonic or ultrasonic wave received from the shelf.

4. The detection system of claim 2, further comprising a plurality of cameras configured to capture images of the item on or near the shelf.

5. The detection system of claim 4, wherein the processor is further configured to identify the item based on the captured images.

6. The detection system of claim 5, wherein the processor is configured to automatically order the identified item when the item weight drops below a threshold weight associated with the item.

7. The detection system of claim 6, wherein the processor is configured to estimate a rate at which the identified item is consumed.

8. The detection system of claim 7, wherein the processor is configured to automatically order the identified item based on the estimated rate at which the identified item is consumed.

9. The detection system of claim 1, wherein the estimate of the weight of the item is based on a difference in frequency between a first frequency of a sonic or ultrasonic wave when the item is not on the shelf and a second frequency of a sonic or ultrasonic wave received while the item is on the shelf.

10. The detection system of claim 1, wherein the detection system is configured to measure an amplitude of an envelope of the reflected and refracted waves from the shelf as a function of time.

\* \* \* \* \*